United States Patent
Ploshykhyn

(10) Patent No.: US 10,706,100 B2
(45) Date of Patent: Jul. 7, 2020

(54) METHOD OF AND SYSTEM FOR RECOMMENDING MEDIA OBJECTS

(71) Applicant: YANDEX EUROPE AG, Lucerne (CH)

(72) Inventor: Vyktor Vitalyevich Ploshykhyn, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 232 days.

(21) Appl. No.: 15/892,977

(22) Filed: Feb. 9, 2018

(65) Prior Publication Data
US 2019/0042585 A1 Feb. 7, 2019

(30) Foreign Application Priority Data
Aug. 1, 2017 (RU) ................... 2017127317

(51) Int. Cl.
*G06F 16/78* (2019.01)
*G06F 16/2457* (2019.01)
(Continued)

(52) U.S. Cl.
CPC .... *G06F 16/7867* (2019.01); *G06F 16/24578* (2019.01); *G06F 16/00* (2019.01);
(Continued)

(58) Field of Classification Search
CPC .......... G06F 16/24578; G06F 16/9535; G06F 16/435; G06F 16/735; G06F 16/3322;
(Continued)

(56) References Cited

U.S. PATENT DOCUMENTS

| 6,941,321 B2 | 9/2005 | Schuetze et al. |
| 7,548,915 B2 | 6/2009 | Ramer et al. |

(Continued)

FOREIGN PATENT DOCUMENTS

RU 2600541 C2 10/2016

OTHER PUBLICATIONS

RU Search Report with regard to the counterpart patent application RU2017127317 dated Jul. 13, 2018.
(Continued)

*Primary Examiner* — Dennis Truong
(74) *Attorney, Agent, or Firm* — BCF LLP

(57) ABSTRACT

A method of and a system for selecting recommended media objects comprising: acquiring media objects, each respective media object having at least one respective user interaction parameter, acquiring at least one tag associated with each respective media object, receiving, a request for a media object recommendation, acquiring at least one tag and at least one user interaction parameter associated with the media object, determining potential recommended media object candidates based on at least one tag of the media object overlapping with tags associated with the respective media objects, determining for each potential recommended media object candidate, a number of overlapping tags with the media object, generating a respective correspondence parameter based on the number of overlapping tags and the respective user interaction parameter, selecting at least one recommended media object, the at least one recommended media object being associated with a predetermined value of the correspondence parameter.

20 Claims, 5 Drawing Sheets

(51) Int. Cl.

| | |
|---|---|
| *G06F 16/00* | (2019.01) |
| *G06F 16/435* | (2019.01) |
| *G06F 16/58* | (2019.01) |
| *G06F 16/735* | (2019.01) |
| *G06F 16/2458* | (2019.01) |
| *G06F 16/33* | (2019.01) |
| *G06F 16/9535* | (2019.01) |
| *G06F 16/41* | (2019.01) |
| *H04N 21/466* | (2011.01) |
| *H04L 29/08* | (2006.01) |
| *G06Q 30/02* | (2012.01) |
| *G06Q 30/06* | (2012.01) |

(52) U.S. Cl.
CPC ........ *G06F 16/435* (2019.01); *G06F 16/5866* (2019.01); *G06F 16/735* (2019.01); *G06Q 30/0251* (2013.01); *G06Q 30/0631* (2013.01); *H04L 67/306* (2013.01); *H04N 21/4668* (2013.01)

(58) Field of Classification Search
CPC ...... G06F 16/04; G06F 16/489; G06F 16/583; G06F 16/5866; G06F 16/68; G06F 16/70; G06F 16/78; G06F 16/783; G06F 16/7867; H04N 21/44222; H04N 21/2668; H04N 21/4826; H04N 21/252; H04N 21/26258; H04N 21/4668; G06N 20/00; G06N 3/08; G06Q 30/0631; G06Q 50/01
USPC .............. 707/732; 705/26.7; 706/12; 725/46
See application file for complete search history.

(56) References Cited

U.S. PATENT DOCUMENTS

| | | | |
|---|---|---|---|
| 8,209,316 B2 | 6/2012 | Li et al. | |
| 8,577,896 B2 | 11/2013 | Sanders | |
| 8,725,739 B2 | 5/2014 | Liang et al. | |
| 8,868,481 B2 | 10/2014 | Wei et al. | |
| 8,903,834 B2 | 12/2014 | Ciancutti et al. | |
| 9,098,511 B1 | 8/2015 | Lawry et al. | |
| 9,135,211 B2* | 9/2015 | Stern | G06F 15/173 |
| 9,286,294 B2 | 3/2016 | Asmussen et al. | |
| 9,535,897 B2 | 1/2017 | Anderson et al. | |
| 9,582,592 B2* | 2/2017 | Mason | G06F 16/954 |
| 9,639,634 B1* | 5/2017 | Greene | H04N 21/4668 |
| 10,216,763 B2* | 2/2019 | Butterfield | G06F 16/93 |
| 2007/0038614 A1 | 2/2007 | Guha | |
| 2007/0078832 A1* | 4/2007 | Ott | G06F 16/9535 |
| 2009/0125588 A1* | 5/2009 | Black | G06Q 10/107 |
| | | | 709/204 |
| 2009/0150786 A1* | 6/2009 | Brown | G06Q 10/10 |
| | | | 715/733 |
| 2012/0159337 A1* | 6/2012 | Travilla | G06Q 30/0631 |
| | | | 715/738 |
| 2012/0219191 A1* | 8/2012 | Benzarti | G06Q 30/0201 |
| | | | 382/106 |
| 2013/0013372 A1 | 1/2013 | Gomez et al. | |
| 2013/0275429 A1 | 10/2013 | York et al. | |
| 2014/0028010 A1 | 1/2014 | Trava | |
| 2014/0279751 A1 | 9/2014 | Ram et al. | |
| 2015/0026166 A1* | 1/2015 | Han | G06F 16/5866 |
| | | | 707/723 |
| 2015/0339381 A1 | 11/2015 | Jain et al. | |
| 2016/0019217 A1* | 1/2016 | Reblitz-Richardson | G06F 16/24578 |
| | | | 707/731 |
| 2016/0026920 A1 | 1/2016 | Sullivan et al. | |
| 2016/0098640 A1* | 4/2016 | Su | G06N 5/04 |
| | | | 706/50 |
| 2016/0179847 A1* | 6/2016 | Epstein | G06F 16/532 |
| | | | 707/737 |
| 2016/0241894 A1 | 8/2016 | Singh et al. | |
| 2016/0379295 A1* | 12/2016 | Balasubramanian | G06F 16/334 |
| | | | 705/26.7 |
| 2017/0060870 A1 | 3/2017 | Checkley | |
| 2018/0144052 A1* | 5/2018 | Sayyadi-Harikandehei | G06F 7/026 |
| 2019/0286673 A1* | 9/2019 | Sayyadi-Harikandehei | H04N 21/231 |

OTHER PUBLICATIONS

Huang et al., "Real-time Video Recommendation Exploration", SIGMOD'16, 2016, USA, 12 pages.

Vallet et al., "Effects of Usage based Feedback on Video Retrieval: a Simulation based Study", ACM Transactions on Information Systems 29.2 (2011), pp. 1-32, http://dx.doi.org/10.1145/1961209.1961214.

Feldman et al., "Text Mining at the Term Level", PKDD '98 Proceedings of the Second European Symposium on Principles of Data Mining and Knowledge Discovery, 1998, pp. 65-73.

* cited by examiner

METHOD OF AND SYSTEM FOR RECOMMENDING MEDIA OBJECTS

CROSS-REFERENCE

The present application claims priority to Russian Patent Application No. 2017127317, entitled "Method of and System for Recommending Media Objects," filed Aug. 1, 2017, the entirety of which is incorporated herein by reference.

FIELD

The present technology relates to content recommendation, and more particularly, to media object recommendation.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include Google™ search engine, Yandex™ search engine, Yahoo!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the tanked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

As an example, when a user is viewing media content such as videos, recommended video content may appear on the user interface before, after or during interaction with the videos. Examples of platforms proposing recommended video objects include websites and applications such as YouTube™, DailyMotion™, Netflix™ and Yandex.Video™.

Methods for media object recommendation may generally be based on past user behavior, transition history and tags. However such methods may not always be satisfactory and may not always provide the most relevant recommended media objects to a user.

U.S. Patent Publication No. 2014/0279751 A1 by Ram et al. titled "Aggregation and analysis of media content information" teaches a method and apparatus for collecting and analyzing media content metadata. The technology retrieves web documents referencing media objects from web servers. Metadata of the media objects such as global tags and category weight values are generated from the web documents. Affinity values between user identities and the media objects are generated based on online behaviors of the users interacting with the media objects. Based on the affinity values and metadata of the media objects, the technology can provide recommendations of media objects.

U.S. Pat. No. 9,098,511 B1 by Lawry et al. titled "Watch time based ranking" teaches methods, systems, and apparatus, including computer programs encoded on computer storage media, for ranking search results. One of the methods includes identifying one or more sessions for a query and associating watch times of the respective resources watched in the sessions with the query. One or more watch time signals are calculated for a first resource and the query based on the watch times associated with the query. A first search result responsive to the query is obtained, wherein the first search result identifies the first resource and has an associated score S. A new score S' is calculated based on a least S and a watch time function, the watch time function being a function of the one or more watch time signals. The new score S' is provided to a process for ranking search results including the first search result.

U.S. Patent Publication No. 2016/0026920 A1 by Sullivan et al. titled "Online Asset Recommendation System" teaches creating a playlist of multimedia assets based on estimated user viewing length and an estimated length of engagement during a user session. Assets are selected based on an anchor asset displayed with the playlist of multimedia assets.

SUMMARY

Developer(s) of the present technology have appreciated certain technical drawbacks associated with the existing systems and methods for media object recommendation.

The present technology arises from an observation made by the developer(s) that prior art methods for recommending media objects may not always be satisfactory, as media objects that may be relevant to a user may not necessarily be ranked via a regular search ranking algorithm.

Without wishing to be bound to any specific theory, the non-limiting embodiments of the present technology arise from developers' observation that the user interactions parameter can be used as a proxy and/or as a weight to determine the "depth" or "level" of similarity between content items. As such, the non-limiting embodiments of the present technology are directed to a method and a system for recommending media objects to a user based on tags associated with a media object the user has interacted with and based on user interaction parameters weighing the tags, the user interaction parameters being representative of user interactions with the media object. In accordance with the non-limiting embodiments of the present technology, a recommended media object generally has at least one overlapping tag (used for initial selection for recommended items candidates), with the user interaction parameters of the recommended media object and the media object being indicative, at least partially, of a similarity between the media object and the recommended media object (used for ranking the recommended item candidates and selecting "best matches" for the recommendations).

The present technology thereby results, amongst other benefits, in an improved navigation experience by limiting a number of interactions required by the user to interact with media objects of interest. The present technology may present to the user, with or without explicit requests, recommended content corresponding to the content the user has interacted with, therefore allowing to save bandwidth, computer processing power and time.

Therefore, developer(s) have devised methods and systems for media object recommendation.

In accordance with a first broad aspect of the present technology, there is provided a computer-implemented method for selecting recommended media objects, the method executable by a server, the method comprising: acquiring, by the server, a set of indications of media objects, each indication of the set of indications being associated with a respective media object, the respective media object having at least one respective user interaction parameter, the respective user interaction parameter being representative of at least one user interaction with the respective media object, acquiring, by the server, at least one tag associated with each respective media object, the at least one tag being representative of a content of the respective media object, receiving, by the server from a client device, a request for a media object recommendation, the request for the media object recommendation having been triggered by a user having interacted with a media object on the client device, acquiring, by the server, at least one tag and at least one user interaction parameter associated with the media object, determining, by the server, potential recommended media object candidates based on at least one tag of the media object overlapping with tags associated with the respective media objects, determining, by the server, for each potential recommended media object candidate, a number of overlapping tags with the media object, generating, by the server, for each potential recommended media object candidate, a respective correspondence parameter based on the number of overlapping tags and the respective user interaction parameter of the potential recommended media object candidate and the media object, the correspondence parameter being indicative of a level of similarity between the potential recommended object candidate and the media object, selecting, by the server, at least one recommended media object from the potential recommended media object candidates, the at least one recommended media object being associated with a predetermined value of the correspondence parameter.

In some implementations, the generating the respective correspondence parameter for each potential recommended media object candidate comprises: summing, by the server, the respective user interaction parameter of the potential recommended media object candidate and the media object to obtain a respective sum, and multiplying, by the server, for each potential recommended media object, the respective sum by the number of overlapping tags to obtain the respective correspondence parameter.

In some implementations, the generating the respective correspondence parameter for each potential recommended media object candidate comprises: summing, by the server, the respective user interaction parameter of the potential recommended media object candidate and the media object to obtain a respective sum, and summing, by the server, the respective sum for each overlapping tag between the potential recommended media object candidate and the media object to obtain the respective correspondence parameter.

In some implementations, the method further comprises: transmitting, by the server to the client device, an indication of the at least one recommended media object.

In some implementations, each respective media object is associated with a respective identifier.

In some implementations, prior to selecting the at least one recommended media object, the method further comprises: ranking the potential recommended media object candidates according to their respective correspondence parameters.

In some implementations, the media object is a video.

In some implementations, the predetermined value of the correspondence parameter comprises a predetermined number of top-ranked respective correspondence parameters.

In some implementations, the at least one tag is at least one of: a category, a title, a performer, a subject, a description, a language, a related performer, a rating, a director, a text and a location.

In some implementations, the at least one tag associated with each respective media object is acquired from a second server.

In some implementations, the at least one tag was generated from a text associated with each respective media object on the second server.

In some implementations, the user interaction parameter is one of: a view time, a view count, a play rate, an engagement rate, a social sharing rate, a click-through rate (CTR) and a conversion rate.

In accordance with a second broad aspect of the present technology, there is provided a system for selecting recommended media objects, the system comprising: a processor, a non-transitory computer-readable medium comprising instructions, the processor, upon executing the instructions, being configured to: acquire a set of indications of media objects, each indication of the set of indications being associated with a respective media object, the respective media object having at least one respective user interaction parameter, the respective user interaction parameter being representative of at least one user interaction with the respective media object, acquire at least one tag associated with each respective media object, the at least one tag being representative of a content of the respective media object, receive, from a client device, a request for a media object recommendation, the request for the media object recommendation having been triggered by a user having interacted with a media object on the client device, acquire at least one tag and at least one user interaction parameter associated with the media object, determine potential recommended media object candidates based on at least one tag of the media object overlapping with tags associated with the respective media objects, determine, for each potential recommended media object candidate, a number of overlapping tags with the media object, generate for each potential recommended media object candidate, a respective correspondence parameter based on the number of overlapping tags and the respective user interaction parameter of the potential recommended media object candidate and the media object, the correspondence parameter being indicative of a level of similarity between the potential recommended object candidate and the media object, select at least one recommended media object from the potential recommended media object candidates, the at least one recommended media object being associated with a predetermined value of the correspondence parameter.

In some implementations, to generate the respective correspondence parameter for each potential recommended media object candidate, the processor is configured to: sum the respective user interaction parameter of the potential recommended media object candidate and the media object to obtain a respective sum, and multiply for each potential recommended media object, the respective sum by the number of overlapping tags to obtain the respective correspondence parameter.

In some implementations, to generate the respective correspondence parameter for each potential recommended media object candidate, the processor is configured to: sum the respective user interaction parameter of the potential recommended media object candidate and the media object to obtain a respective sum, and sum the respective sum for each overlapping tag between the potential recommended media object candidate and the media object to obtain the respective correspondence parameter.

In some implementations, the processor is further configured to: transmit, to the client device, an indication of the at least one recommended media object.

In some implementations, each respective media object is associated with a respective identifier.

In some implementations, prior to selecting the at least one recommended media object, the system is configured to: rank the potential recommended media object candidates according to their respective correspondence parameters.

In some implementations, the media object is a video.

In some implementations, the predetermined value of the correspondence parameter comprises a predetermined number of top-ranked respective correspondence parameters.

In some implementations, the at least one tag is at least one of: a category, a title, a performer, a subject, a description, a language, a related performer, a rating, a director, a text and a location.

In some implementations, the at least one tag associated with each respective media object is acquired from a second server.

In some implementations, the at least one tag was generated from a text associated with each respective media object on the second server.

In some implementations, the user interaction parameter is one of: a view time, a view count, a play rate, an engagement rate, a social sharing rate, a click-through rate (CTR) and a conversion rate.

In the context of the present specification, unless expressly provided otherwise, a "computer system", an "electronic device", a "mobile device", "a device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "media server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
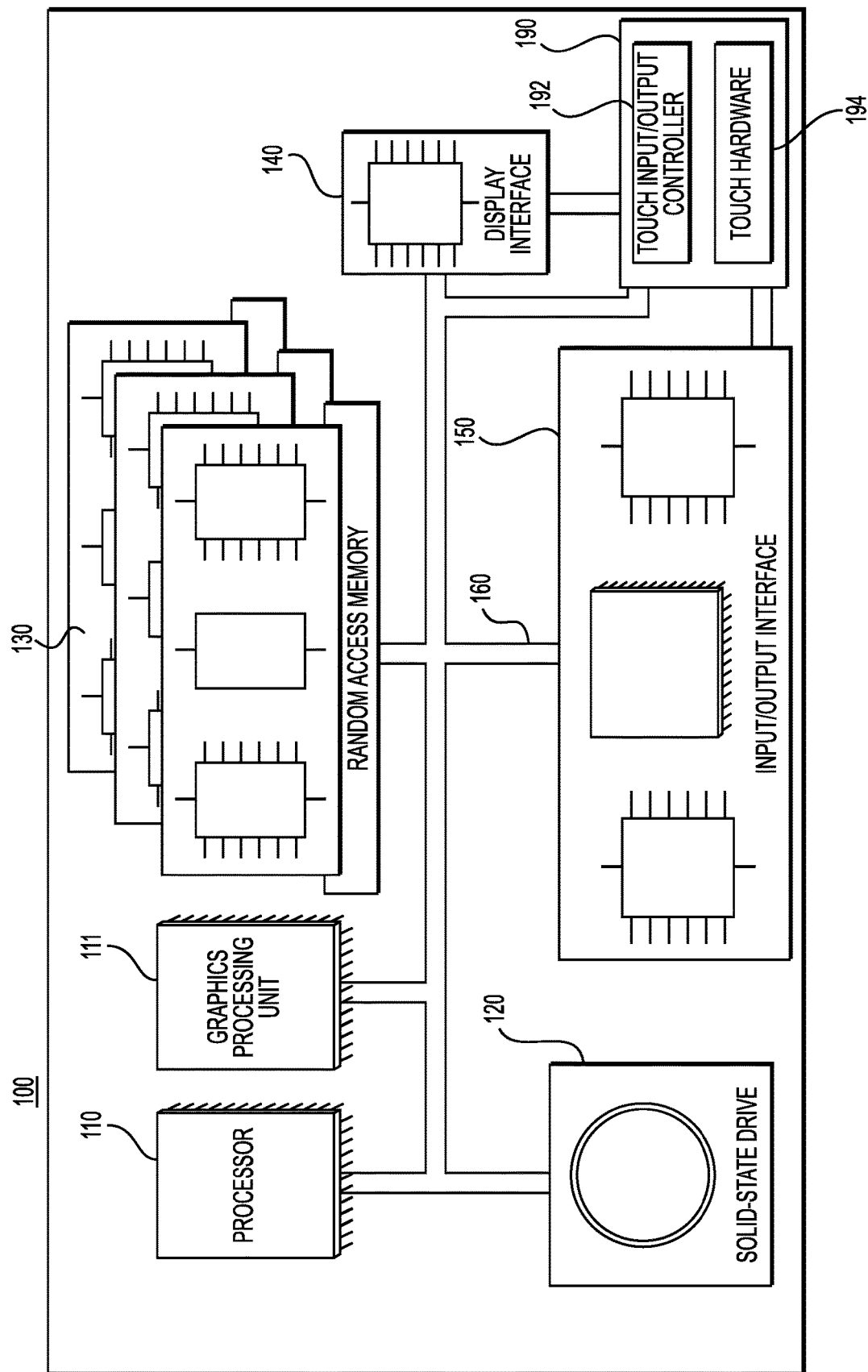
FIG. 1 is a schematic illustration of a client device being used in conjunction with implementations of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a client device 100 suitable for use with some implementations of the present technology, the client device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the client device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In some embodiments, the input/output interface 150 may be connected to a keyboard (not shown), a mouse (not shown) or a trackpad (not shown) allowing the user to interact with the client device 100 in addition or in replacement of the touchscreen 190.

According to implementations of the present technology, the solid-state drive 120 stores program instructions suitable for being loaded into the random access memory 130 and executed by the processor 110 and/or the GPU 111. For example, the program instructions may be part of a library or an application.

The client device 100 may be a server, a desktop computer, a laptop computer, a tablet, a smartphone, a personal digital assistant or any device that may be configured to implement the present technology, as should be understood by a person skilled in the art.

Figure 2:
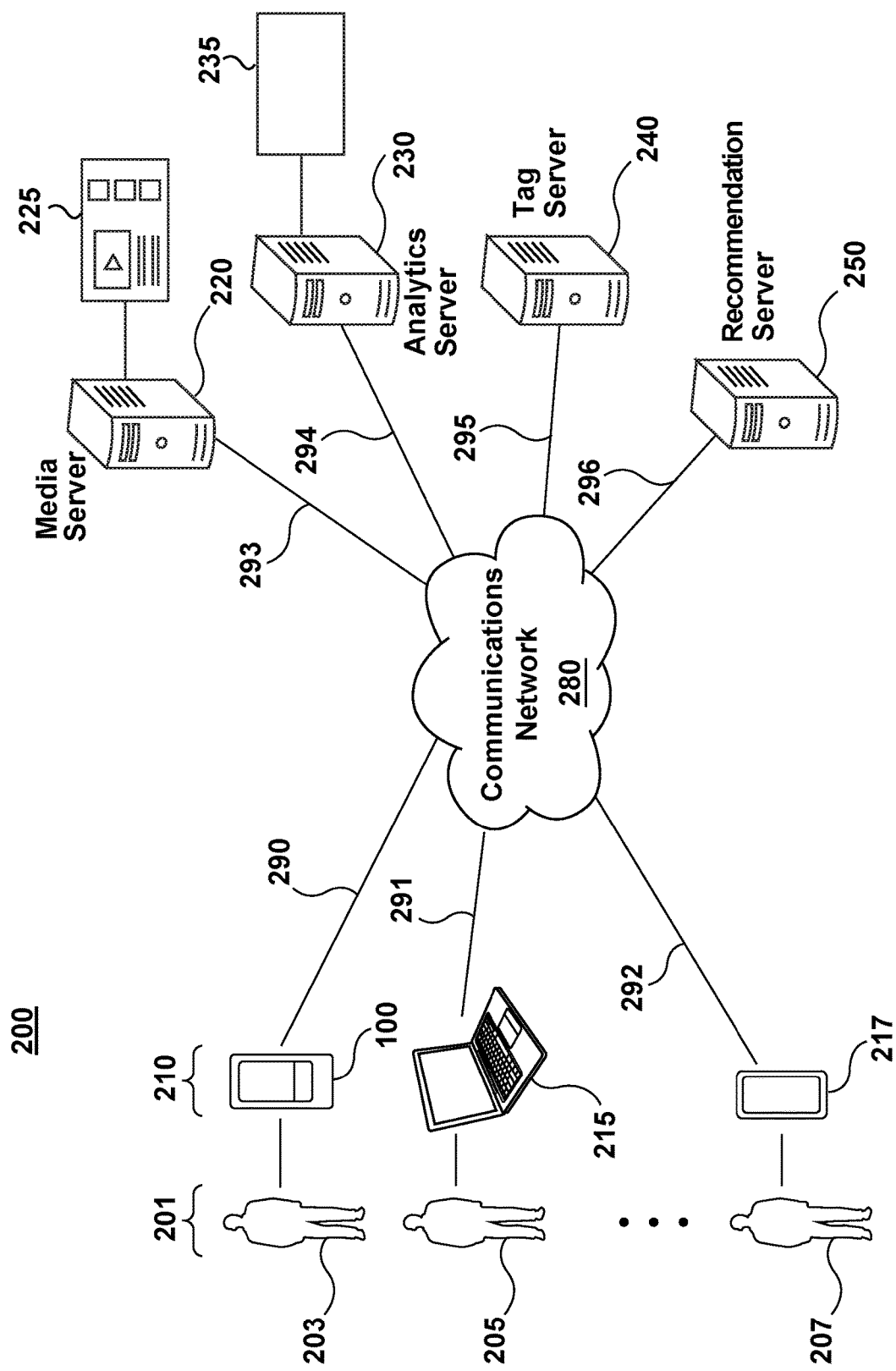
FIG. 2 is a schematic illustration of a communication system in accordance with non-limiting embodiments of the present technology.

Now turning to FIG. 2, a communication system 200 is illustrated in accordance with an embodiment of the present technology. The communication system 200 comprises a plurality of users 201, the plurality of users 201 comprising a first user 203, a second user 205, a third user 207 and fourth user 209 respectively associated with the first client device 100, a second client device 215, a third client device 217, and a fourth client device 219 coupled to a communications network 280 via respective communication links 290, 291, 292.

The first client device 100 may be implemented as a smartphone, the second client device 215 may be implemented as a laptop, the third client device 217 may be implemented as a smartphone and the fourth client device 219 may be implemented as a tablet. In some non-limiting embodiments of the present technology, the communications network 280 can be implemented as the Internet. In other embodiments of the present technology, the communications network 280 can be implemented differently, such as any wide-area communications network, local-area communications network, a private communications network and the like. Broadly speaking, other client devices, such as the second client device 215, the third client device 217 and the fourth client device 219 may have the same components as the client device 100.

How the communication links 290, 291 and 292 are implemented is not particularly limited and will depend on how the first client device 100, the second client device 215, the third client device 217 and the fourth client device 219 are implemented. Merely as an example and not as a limitation, in those embodiments of the present technology where at least one of the first client device 100, the second client device 215, the third client device 217 and the fourth client device 219 is implemented as a wireless communication device (such as a smart-phone), each one of the respective communication links 290, 291 and 292 can be implemented as a wireless communication link (such as but not limited to, a 3G communications network link, a 4G communications network link, a Wireless Fidelity, or WiFi® for short, Bluetooth® and the like) or a combination of the above.

In those examples, where at least one of the first client device 100, the second client device 215, the third client device 217 and the fourth client device 219 are implemented respectively as laptop, smartphone, tablet computer, the respective communication links 290, 291 and 292 can be either wireless (such as the Wireless Fidelity, or WiFi® for short, Bluetooth® or the like) or wired (such as an Ethernet based connection) or a combination of the two.

It should be expressly understood that implementations for the first client device 100, the second client device 215, the third client device 217, the fourth client device 219, the communication link 290 and the communications network 280 are provided for illustration purposes only. As such, those skilled in the art will easily appreciate other specific implementational details for the first client device 100, the second client device 215, the third client device 217, the fourth client device 219 and the communication link 290 and the communications network 280. As such, by no means, examples provided herein above are meant to limit the scope of the present technology. While only four client devices 100, 215, 218 and 219 are illustrated (all are shown in FIG. 2), it is contemplated that any number of client devices 100, 215, 218 and 219 could be connected to the communications network 280 of the communication system 200. It is further contemplated that in some implementations, the number of client devices 100, 215, 218 and 219 included in the communication system 200 could number in the tens or hundreds of thousands.

Also coupled to the communications network 280 is a media server 220, an analytics server 230, a tag server 240, and a recommendation server 250 via respective communication links 293, 294, 295 and 296. The media server 220, the analytics server 230, the tag server 240 and the recommendation server 250 can be implemented as conventional computer servers. In an example of an embodiment of the present technology, each one of the media server 220, the analytics server 230, the tag server 240 and the recommendation server 250 can be implemented as a Dell™ PowerEdge™ Server running the Microsoft™ Windows Server™ operating system. Needless to say, any one of the media server 220, the analytics server 230, the tag server 240 and the recommendation server 250 can be implemented in any other suitable hardware and/or software and/or firmware or a combination thereof. It is also noted that a given one of the media server 220, the analytics server 230, the tag server 240 and the recommendation server 250 can be implemented differently from one or more other ones of the media server 220, the analytics server 230, the tag server 240 and the recommendation server 250.

How the communication links 293, 294, 295 and 296 are implemented is not particularly limited and will depend on how media server 220, the analytics server 230, the tag server 240 and the recommendation server 250 are implemented. Broadly speaking, the communication links 293, 294, 295, 296 may all be wired connections to the communications network 280, however other implementations are possible, as an example when at least two of the media server 220, the analytics server 230, the tag server 240 and the recommendation server 250 are located in the same location.

In the depicted non-limiting embodiment of the present technology, the media server 220 may host a media streaming electronic service 225. The media streaming electronic service 225 may be any computer-implemented service a user (such as the first user 203, the second user 205, the third user 207 and the fourth user 209 of the plurality of users 201) can interact with via an electronic client device (such as one of the first client device 100, the second client device 215, the third client device 217, the fourth client device 219). The media streaming electronic service 225 may be a website (that may or may not be hosted on the media server 220) allowing to interact with media content. In alternative embodiments, the media streaming electronic service 225 of the media server 220 may be accessed by a client device (such as one of the first client device 100, the second client device 215, the third client device 217, the fourth client device 219) via an app executed on a device such as a smartphone or a tablet acquired from the Apple™ App Store™ or the Google™ Play Store™. In other embodiments, the media streaming electronic service 225 may be accessed through a smart TV or a TV box that allow browsing the internet and installing applications.

Media content may include video content, images, gifs, video games, virtual reality (VR) content, and audio files. The media streaming electronic service 225 may allow searching for media content and may recommend related media content to users (such as the plurality of users 201) based on previous user interactions with media content, on implicit or explicit user preferences, or based on popularity. The media server 220 may or may not host a portion of the media content it provides through the media streaming electronic service 225. In some embodiments, the media streaming electronic service 225 located on the media server 220 may be a media content aggregator and may not host any media content.

The analytics server 230 may track user interactions of the plurality of users 201 with media objects of the media streaming electronic service 225 of the media server 220 via an analytics service 235. The analytics service 235 may or may not be part of the media streaming electronic service 225 of the media server 220. The analytics service 235 may track user interactions with the media streaming electronic service 225 via a code snippet inserted in pages of the media streaming electronic service 225 to obtain user interaction parameter. Non-limiting examples of user interaction parameter include watch time, play time, average view duration, comments, likes, dislikes, shares, subscribers, demographics, playback locations, traffic sources, devices, audience retention. The analytics service 235 may implement an application programming interface (API) library in any programming language, such as, but not limited to, Go, Java, JavaScript, .NET, PHP, Python or Ruby to allow acquisition of user interaction parameter. As a non-limiting example, user interaction parameter may be acquired all at once in the form of a vector, may be acquired individually, or may be acquired in any format specified by a requester via the API.

Broadly speaking, the user interaction parameter is indicative of a level of interaction of a given user with a given media content item. For example, using watch time, the user interaction parameter is proportionate to (or actually contains) a duration of the user interaction with the given media content item.

Non-limiting examples of analytics services includes Google™ Analytics™ and Yandex.Metrica™.

The tag server 240 may be associated with the media server 220. The tag server 240 may generally provide metadata tags for media objects of the media streaming electronic service 225. The tags may originate from human assessors (not depicted) or from users (such as the first user 203, the second user 205, the third user 207 and the fourth user 209 of the plurality of users 201) of the media streaming electronic service 225.

In an embodiment, the tags may be acquired by the tag server 240 by analyzing the text of a page of a resource where the media object is displayed. As a non-limiting example, in embodiments where the media object is a video, the tags may be acquired from the text surrounding a video on YouTube™ electronic service (such as text introducing the video, user comments, and the like).

As another non-limiting example, the tags may be acquired from a page of the media streaming electronic service 225 associated with the respective media object, where users (such as the first user 203, the second user 205, the third user 207 and the fourth user 209 of the plurality of users 201) may enter their own tags or leave a comment with a hashtag (using the "#" hash sign) describing the respective media object.

In alternative embodiments, each media object of the media streaming electronic service 225 may go through a speech-to-text conversion, and a resulting text may be analyzed to extract tags. As a non-limiting example, term frequency—inverse document frequency (TF-IDF) of the document may be used to define tags for the given media object. In other embodiments, the tag server 240 may acquire text information from other sources or servers. As a non-limiting example, in cases where media objects are videos, the tag server 240 may acquire text from a service providing subtitles for movies and documentaries, and extract tags from the text. As another non-limiting example, where the media object is a video or a music file, the tag server 240 may acquire lyrics associated with the video or music file from a service providing lyrics. Again, as another non-limiting example, the tag server 240 may parse web pages or encyclopedia entries (such as from Wikipedia™) for text associated with the media object and extract tags. In embodiments where the media object is a video game, the tag server 240 may acquire information from dialogues associated with the video game. In some embodiments, the number of tags per video may be limited e.g. 2000 tags to reduce processing time. As it may be understood, each media object may not necessarily have the same number of associated tags.

Tags may generally be represented in the form of vectors, with a tag vector being associated with a given media object. Each element of a tag vector may correspond to a tag, the tag being indicative of a content of the media object. As a non-limiting example, in embodiments where the media object is a video, the tags may correspond to: a category, a title, one or more performers, a subject, a description, a language, a related performer, a rating, a director, a writer, a location. As stated previously, depending on the type and content of the media object, the number of elements of the tag vector may vary.

The recommendation server 250 may recommend media objects to be presented in the media streaming electronic service 225. The recommendation server 250 may generally be connected to the analytics service 235 of the analytics server 230 via an API, and acquire data of user interactions with the media streaming electronic service 225 at predetermined intervals of time or when receiving a specific request or instruction from the media streaming electronic service 225. As a non-limiting example, the recommendation server 250 may continuously analyze data stored by the analytics server 230 to create recommendations based on a subset of all media content (not depicted). The subset of all media content may be, as a non-limiting example, a top 1000 of most popular media content items in each category, or a global top 10000 of most popular media content items. In other embodiments, the recommendation server 250 may recommend media content only when receiving a request from the media streaming electronic service 225 or from a client device (such as one of the plurality of client devices 210) for recommendation.

The recommendation server 250 may also be configured to acquire tags (not depicted) related to media objects of the media streaming electronic service 225 from the tag server 240.

Figure 3:
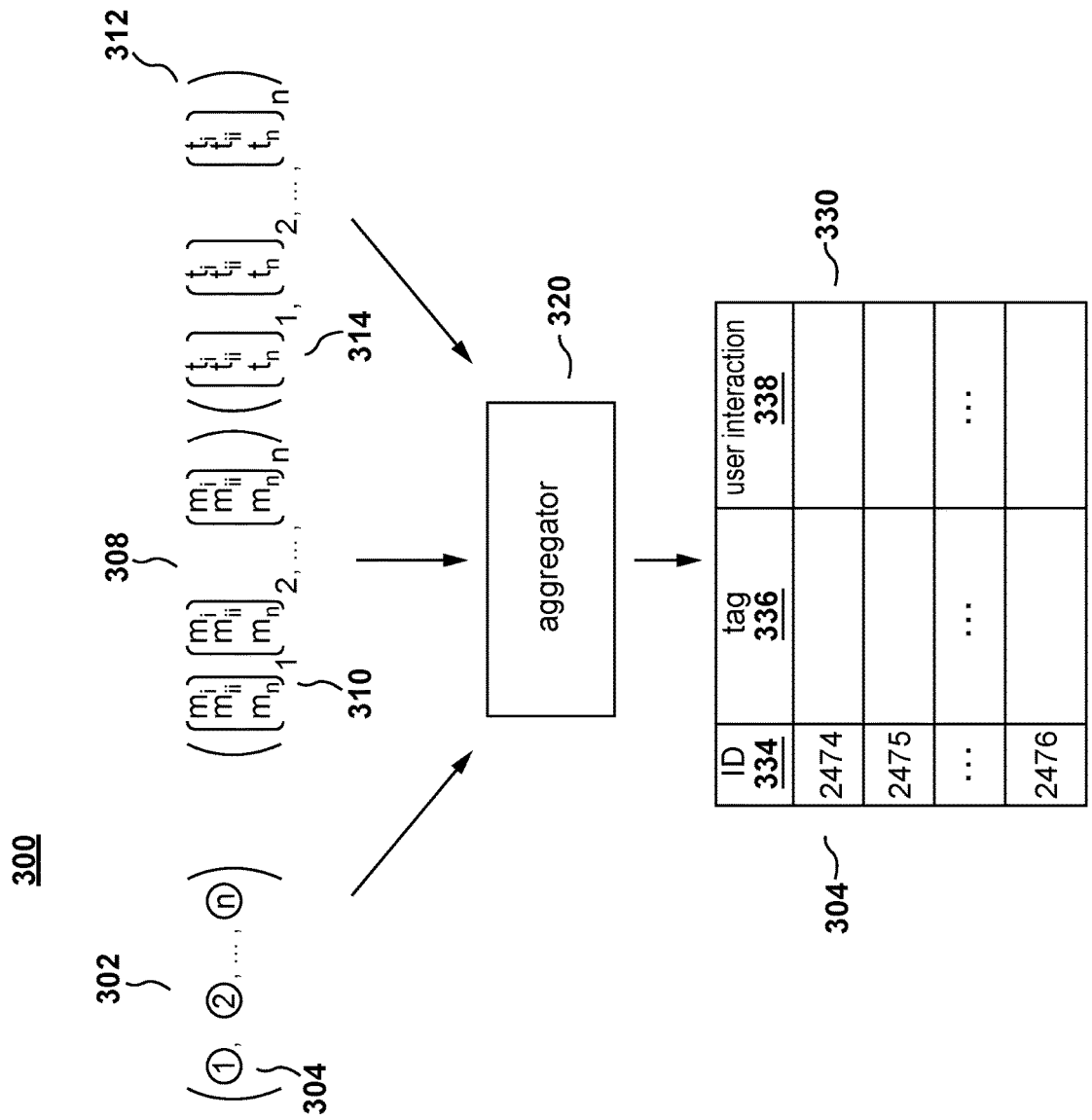
FIG. 3 is a schematic illustration of a media object acquisition procedure in accordance with non-limiting embodiments of the present technology.

Now turning to FIG. 3, a media object acquisition procedure 300 is illustrated in accordance with non-limiting embodiments of the present technology.

The media object acquisition procedure 300 may be executed on the recommendation server 250, and may comprise the execution of an aggregator 320 as part of the media object acquisition procedure 300.

The recommendation server 250 may acquire an indication or a set of indications of a set of media objects 302, the set of media objects 302 comprising respective media objects 304. The set of media objects 302 may be acquired in the form of a plurality of indications, where, as a non-limiting example, each respective media object 304 may be represented by an identifier associated with the respective metric vector 305. The identifier may be a unique number, a name, a uniform resource locator (URL) or any other means allowing identifying and accessing/retrieving each respective media object 304. In other embodiments, each respective media object 304 may comprise additional metadata, depending on the type of media object.

The recommendation server 250 may also acquire a set of user interaction parameters 308, each user interaction parameter 310 being representative of user interactions with a respective media object 304. The set of user interactions parameters 308 may be acquired by the recommendation server 250 from the analytics service 235 of the analytics server 230.

Depending on how the analytics server 230 is implemented, each user interaction parameter 310 of the set of user interaction parameter 308 may correspond to a single number representative of a totality user interactions of a plurality of users (such as the plurality of users 201) with the respective media object 304. In other embodiments, each user interaction parameter 310 may be a vector having different total user interaction parameters as elements. In alternative embodiments, each user interaction parameter 310 may be a vector having total user interaction parameters for different periods of time. Non-limiting examples of user interaction parameters include: a view time, a view count, a play rate, an engagement rate, a social sharing rate, a click-through rate (CTR), and a conversion rate. In some embodiments, the set of user interaction parameters 308 may be acquired from a subset of the plurality of users having interacted with the media objects. As a non-limiting example, only user interaction parameters 310 of users having similar profile information or past user interaction history may be considered in the subset, thereby allowing to recommend media objects to a user with more accuracy.

The recommendation server 250 may also acquire a set of tags 312, each respective tag vector 314 of the set of tags 312 being associated with the respective media object 304 of the set of media objects 302. The set of tags 312 may be acquired from the tag server 240. In other embodiments, the set of tags 312 may be acquired from the media streaming electronic service 225 of the media server 220 or from another server (not depicted) which may maintain a tag database (not depicted).

The set of media objects 302, the set of user interaction parameter 308 and the set of tags 312 may go through the aggregator 320, the aggregator 320 being configured to associate the set of media objects 302 with the user interaction parameter 308 and the set of tags 312, and store the association in a database. As a non-limiting example, the aggregator 320 may output a table 330, the table 330 having an ID column 334 for identifying the respective media object 304, a tag column 336 for identifying the associated respective tag vector 314 and a user interaction column 338 for identifying the respective user interaction parameter 310. The table 330 may contain all media objects of the media streaming electronic service 225 or may contain a subset of all media objects of the media streaming electronic service 225. The table 330 may be continuously updated, as an example when a new media object is added to the media streaming electronic service 225, or may be updated at predetermined intervals of time.

How the table 330 is implemented is not limited, and the respective media object 304, the respective metric parameter 308 and the respective tag vector 316 may be associated, as a non-limiting example, in a key-value database (not depicted).

The association of the respective media object 304 with the respective user interaction parameter 310 and the respective tag vector 314 may allow the user interaction parameter 310 to function as a weight for each tag of the respective tag vector 314 for the respective media object 304, thereby allowing to measure, at least partially, the similarity of other media objects with overlapping tags and recommend the media objects to a user (such as one of the plurality of users 210) interacting with the media streaming electronic service 225 of the media server 220.

The table 330 may be stored at the recommendation server 250. The table 330 may be used to make media object recommendation to users (such as the plurality of users 201) of the media streaming electronic service 225 when receiving a request.

Figure 4:
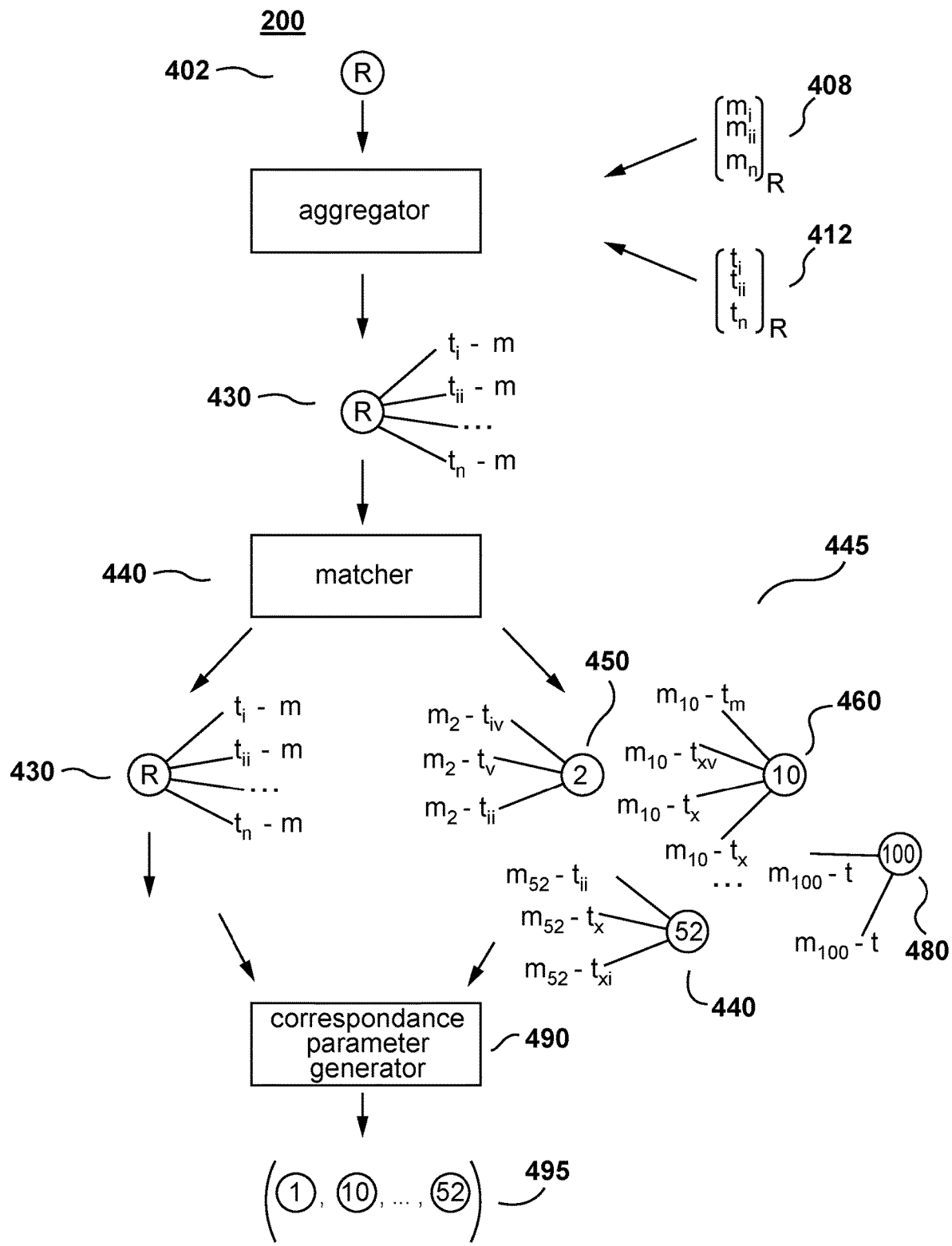
FIG. 4 is a schematic illustration of media object recommendation procedure in accordance with non-limiting embodiments of the present technology.

Reference is now being made to FIG. 4, where a media object recommendation procedure 400 is illustrated in accordance with non-limiting embodiments of the present technology.

The media object recommendation procedure 400 comprises the execution of an aggregator 420, a matcher 440 and a correspondence parameter generator 490.

A request for a media object recommendation 402 may be received at the aggregator 420 of the recommendation server 250. The request for the media object recommendation 402 may be received directly or indirectly from a client device (such as from one of the plurality of client devices 210) or may be received from the media streaming electronic service 225 of the media server 220.

As a non-limiting example, the request for the media object recommendation 402 may be automatically sent to the recommendation server 250 by the media streaming electronic service 225 of the media server 220 when a user (such as the user 205) has finished interacting (or is about to finish interacting, such as almost reaching an end of the given media content item) with the media object of the media object recommendation 402 via the client device 215 and the media streaming electronic service 225 may be required to recommend more media object content to the user 205. In other embodiments, the user 205 may explicitly request a recommendation based on a particular media object (not depicted). Again, in other embodiments, the request for the media object recommendation 402 may be sent to the recommendation server 250 as soon as one of the plurality of users 210 interacts with the media streaming electronic service 225, based on past user interaction of one of the plurality of users 210.

The request for the media object recommendation 402 generally comprises an identifier (such as a unique number, an URL, a hash or a title) allowing the recommendation server 250 to identify the specific media object (in cases when the media object has been previously indexed by the recommendation server 250) for which a content recommendation needs to be generated. In alternative embodiments, the recommendation server 250 may not have previously indexed the media object of request of the media object recommendation 402 and may create a new entry in the table 330 (in which case the request for the media object recommendation 402 may include the specific media object for which recommendation is required).

The aggregator 420 of the recommendation server 250 may also acquire (by sending a request to the analytics service 235) or receive (without requesting) a user interaction parameter 408 and a tag vector 412 associated with the request for a media object recommendation 402 respectively from the analytics server 230 and the tag server 240. In some embodiments, the request for a media object recommendation 402 may already include at least one of the user interaction parameter 408 and the tag vector 412. In other embodiments, where the media object of the request for the media object recommendation 402 has already been indexed by the recommendation server 250, the aggregator 420 may acquire at least one of the user interaction parameter 408 and the tag vector 412 from the table 330 or from a storage medium of the recommendation server 250.

The aggregator 420 may then associate the media object 402, the user interaction parameter 408 and the tag vector 412 to obtain the media object 430 (which may be an identifier or an indication).

The media object 430 may then be received at the matcher 440. The matcher 440 is configured to generate a set of potential recommended media object candidates 445. The matcher 440 may generate the set of the potential recommended media object candidates 445 based on the information stored in the table 330 maintained by the recommendation server 250.

The matcher 440 may generate the potential recommended media object candidates by analyzing the table 330 to find media objects that have overlapping tags with the media object 430. In some embodiments, the matcher 440 may have a threshold number of tags that need to be overlapping with the tags of the tag vector 412 for a media object to be considered a recommended media object candidate. In other embodiments of the present technology, at least one overlapping tag may be sufficient for a given media object to be considered to be the potential recommended media object candidate. In yet another additional embodiment, the matcher 440 can rank all potential recommended media object candidates and select a predetermined number of top potential recommended media object candidates (i.e. ones having the highest number of overlapping tags).

In some embodiments, the matcher 440 may be configured to lemmatize a tag to determine a lemma for the tag, e.g. the tags "run", "runs", "ran" and "running" may be converted to "run" and then be considered as being corresponding or intersecting tags. In other embodiments, the matcher 440 of the recommendation server 250 may also be configured to consider synonym of tags, which may be equivalent to tags of the media object 430.

The matcher 440 may then output the set of potential recommended media object candidates 445, where each media object of the set of potential recommended media object candidates 445 has at least one tag overlapping with the media object 430. Depending on how the matcher 440 is implemented, the number of overlapping tags for each media object of the set of potential recommended media object candidates 445 may be determined after having found one overlapping tag, or may be determined at the same time.

A media object (such as the first potential recommended media object candidate 450, the second potential recommended media object candidate 460, the third potential recommended media object candidate 470 and the fourth potential recommended media object candidate 480) of the set of potential recommended media object candidates 445 having at least one overlapping tag with the media object 430 may be indicative that the media object in the set of potential recommended media object candidates 445 may have similarities with the media object 430, and may be of interest to a user (such as one user of the plurality of users 201). The matcher 440 may have a threshold of the number of members in the set of potential recommended media object candidates 445 (in cases where there is a significant number of potential recommended media object candidates). As an example, only media objects having at least 10 overlapping tags may be considered in the set of potential recommended media object candidates 445.

The media object 430 and the set of potential recommended media object candidates 445 may then go through the correspondence parameter generator 490, the correspondence parameter generator 490 allowing to further analyze the media objects of the set of potential recommended media object candidates 445 to identify those objects that may be of interest for a user (such as one of the plurality of users 201). In embodiments where the number of potential recommended media object candidates in the set of potential recommended media object candidates 445 is low (e.g. less than a threshold of three media objects), the set of potential recommended media object candidates 445 may not go through the correspondence parameter generator 490.

The correspondence parameter generator 490 may generate a respective correspondence parameter for each pair, a pair comprising the media object 430 and a potential media object candidate of the set of potential recommended media object candidates 445. The respective correspondence parameter may be generated based on the user interaction parameter 408 of the media object 430 and the user interaction parameter of the potential recommended media object (such as one of the first potential recommended media object candidate 450, the second potential recommended media object candidate 460, the third potential recommended media object candidate 470 and the fourth potential recommended media object candidate 480).

Generally, for each overlapping tag between the media object 430 and the potential media object candidate, the correspondence parameter generator 490 may sum the respective user interaction parameter to obtain a respective sum. Then, the correspondence parameter generator 490 may sum the respective sums of the overlapping tags to obtain the respective correspondence parameter, the correspondence parameter being indicative of a level of similarity between the potential recommended object candidate and the media object 430.

How the correspondence parameter is generated is not limited, and as another non-limiting example, the correspondence parameter generator 490 may generate the respective correspondence parameter by multiplying the number of overlapping tags for each pair by the sum of the user interaction parameter of the media object 430 and the potential recommended media object candidate of the set of potential recommended media object candidates 445.

Broadly speaking, the user interaction parameter may weigh the overlapping tags, and the respective sum of the user interaction parameter may represent the strength of the similarity between the media object 430 and each one of the potential media object candidates of the set of potential recommended media object candidates 445.

The correspondence parameter generator 490 may also rank the potential media object candidates of the set of potential recommended media object candidates 445 to obtain a set of recommended media objects 495 based on the correspondence parameters. In some embodiments, the correspondence parameter generator 490 may only select a predetermined number of media objects to recommend based on their correspondence scores (e.g. depending on the real estate of the screen of the user, and the number of potential recommended media object candidates). The recommendation server 250 may then send the set of recommended media objects 495 to the media streaming electronic service 225 of the media server 220 or directly to one of the plurality of the client devices 210.

As it may be understood, media objects may be suggested because of a high user interaction parameter even if the number of overlapping tags is lesser than for another media object that has lower user interaction parameter but that may be potentially more relevant (because of a higher number of overlapping tags). In some embodiments, a threshold limit on the user interactions may be defined, e.g. a view time user interaction parameter higher than 100,000 may be set as 100,000 to remove bias from correspondence parameter generator 490.

The functionality of the aggregator 420, the matcher 440 and the correspondence parameter generator 490 are provided as simplified illustrative examples of the present technology, and their respective functions may be combined and distributed on other servers.

Figure 5:
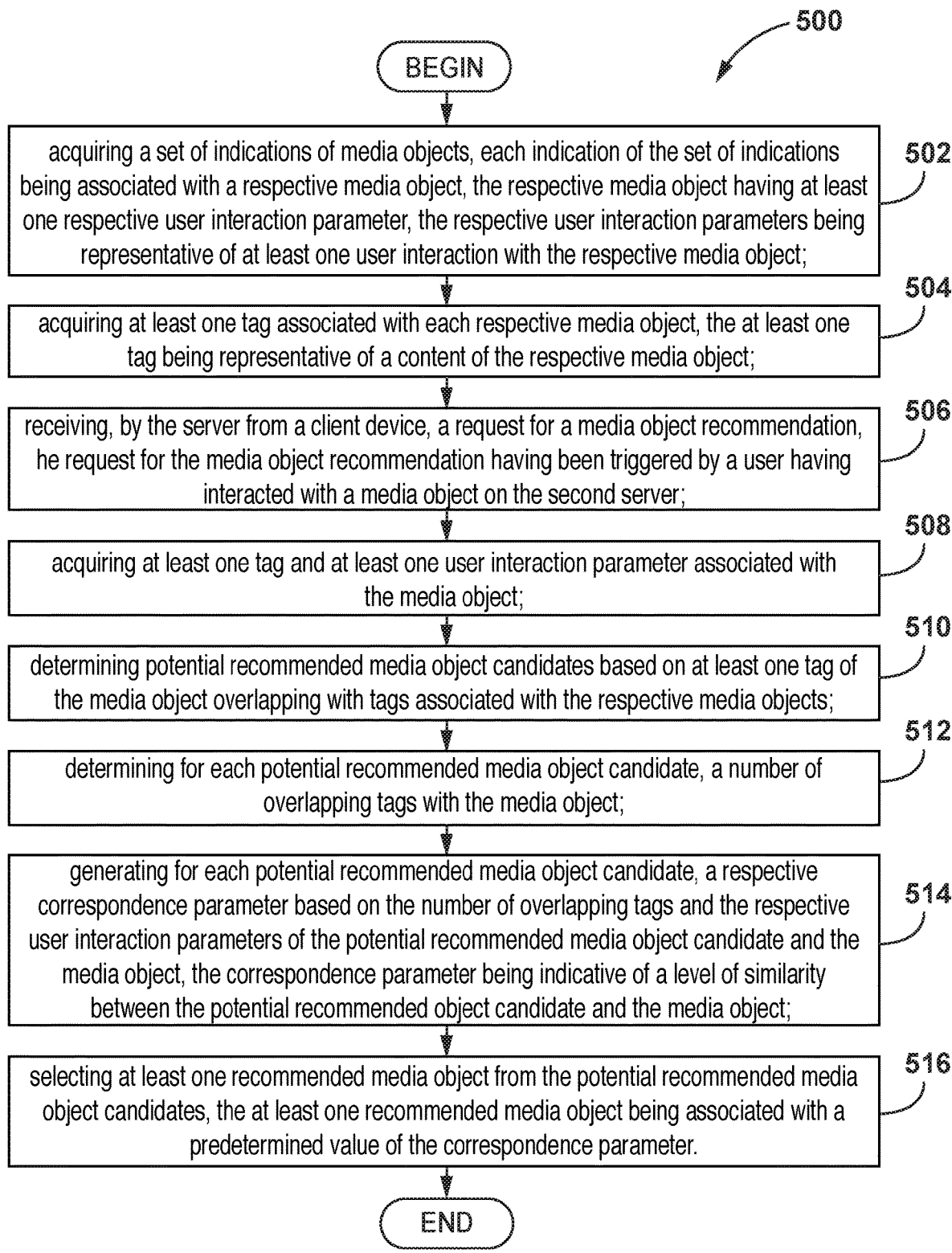
FIG. 5 is a block diagram depicting a flowchart illustrating the non-limiting implementation of a method for recommending media objects in accordance with an embodiment of the present technology.

Now turning to FIG. 5, a flowchart illustrating the non-limiting implementation of a method 500 for recommending media objects in accordance with an embodiment of the present technology.

The method 500 for recommending media objects may start at step 502.

STEP 502: acquiring a set of indications of media objects, each indication of the set of indications being associated with a respective media object, the respective media object having at least one respective user interaction parameter, the respective user interaction parameter being representative of at least one user interaction with the respective media object.

At step 502, the recommendation server 250 may acquire a set of indications of media objects 302, each indication of the set of indications being associated with a respective media object 304, the respective media object 304 having at least one respective user interaction parameter 308, the respective user interaction parameter 310 being representative of at least one user interaction with the respective media object 304. In some embodiments, the media objects 302 may be videos and the respective user interaction parameter 308 may be one of: a view time, a view count, a play rate, an engagement rate, a social sharing rate, a click-through rate (CTR) and a conversion rate.

The method 500 may then advance to step 504.

STEP 504: acquiring at least one tag associated with each respective media object, the at least one tag being representative of a content of the respective media object At step 504, the recommendation server 250 may acquire at least one tag vector 314 associated with each respective media object 304, the at least one tag vector 314 being representative of a content of the respective media object 304. The at least one tag vector 314 may be at least one of a category, a title, a performer, a subject, a description, a language, a related performer, a rating, a director, a text and a location. In some embodiments, the at least one tag may have been generated from a textual context associated with each respective media object 304 on the media streaming electronic service 225 of the media server 220.

The method 500 may then advance to step 506.

STEP 506: receiving, by the server from a client device, a request for a media object recommendation, the request for the media object recommendation having been triggered by a user having interacted with a media object on the client device At step 506, the recommendation server 250 may receive a request for a media object recommendation 402 caused by the client device 100, the request for the media object recommendation 402 having been triggered by a user 203 having interacted with a media object on the media streaming electronic service 225 of the media server 220. The method 500 may then advance to step 508.

STEP 508: acquiring at least one tag and at least one user interaction parameter associated with the media object At step 508, the recommendation server 250 may acquire at least one tag vector 412 and at least one user interaction parameter 408 associated with the media object recommendation 402. The method 500 may then advance to step 510.

STEP 510: determining potential recommended media object candidates based on at least one tag of the media object overlapping with tags associated with the respective media objects At step 510, the recommendation server 250 may determine the set of potential recommended media object candidates 445 based on at least one tag of the media object 430 overlapping with tags associated with the respective media objects 302. The method 500 may then advance to step 512.

STEP 512: determining for each potential recommended media object candidate, a number of overlapping tags with the media object At step 512, the recommendation server 250 may determine for each potential recommended media object candidate of the set of potential recommended media object candidates 445, a number of overlapping tags with the media object 430. The method 500 may then advance to step 514.

STEP 514: generating for each potential recommended media object candidate, a respective correspondence parameter based on the number of overlapping tags and the respective user interaction parameter of the potential recommended media object candidate and the media object, the correspondence parameter being indicative of a level of similarity between the potential recommended object candidate and the media object At step 514, the recommendation server 250 may generate for each potential recommended media object candidate of the set of potential recommended media object candidates 445, a respective correspondence parameter based on the number of overlapping tags and the respective user interaction parameter of the potential recommended media object candidate and the media object 430, the correspondence parameter being indicative of a level of similarity between the potential recommended object candidate the set of potential recommended media object candidates 445 and the media object 430. In some embodiments, the respective correspondence parameter may be generated by: summing the respective user interaction parameter of the potential recommended media object candidate of the set of potential recommended media object candidates 445 and the media object 302 to obtain a respective sum and multiply for each potential recommended media object of the set of potential recommended media object candidates 445, the respective sum by the number of overlapping tags to obtain the respective correspondence parameter. The respective correspondence parameter may also be generated by summing the respective user interaction parameter of the potential recommended media object candidate of the set of potential recommended media object candidates 445 and the media object 302 to obtain a respective sum and summing the respective sum for each overlapping tag between the potential recommended media object candidate of the set of potential recommended media object candidates 445 and the media object to obtain the respective correspondence parameter.

The method 500 may then advance to step 516.

STEP 516: selecting at least one recommended media object from the potential recommended media object candidates, the at least one recommended media object being associated with a predetermined value of the correspondence parameter At step 516, the recommendation server 250 may select at least one recommended media object 495 from the set of potential recommended media object candidates 445, the at least one recommended media object 495 being associated with a predetermined value of the correspondence parameter. The recommendation server 250 may also rank the potential recommended media object candidates 445 according to their respective correspondence parameters. The predetermined value of the correspondence parameter comprises a predetermined number of top-ranked respective correspondence parameters. The recommendation server 250 may then transmit to the client device 100 (directly or via the media streaming electronic service 225 of the media server 220) the indication of at least one recommended media object 495.

The method 500 may then end.

It should be apparent to those skilled in the art that at least some embodiments of the present technology aim to expand a range of technical solutions for addressing a particular technical problem, namely executing media object recommendation.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for selecting recommended media objects, the method executable by a server, the method comprising:
   acquiring, by the server, a set of indications of media objects, each indication of the set of indications being associated with a respective media object, the respective media object having at least one respective user interaction parameter, the respective user interaction parameter being indicative of a level of interaction of at least one user with the respective media object;
   acquiring, by the server, at least one tag associated with each respective media object, the at least one tag being representative of a content of the respective media object;
   receiving, by the server from a client device, a request for a media object recommendation, the request for the media object recommendation having been triggered by a user having interacted with a media object via the client device;
   acquiring, by the server, at least one tag and at least one user interaction parameter associated with the media object;
   determining, by the server, potential recommended media object candidates based on at least one tag of the media object overlapping with tags associated with the respective media objects;
   determining, by the server, for each potential recommended media object candidate, a number of overlapping tags with the media object;
   generating, by the server, for each potential recommended media object candidate, a respective correspondence parameter based on the number of overlapping tags and the respective user interaction parameter of the potential recommended media object candidate and the media object, the correspondence parameter being indicative of a level of similarity between the potential recommended object candidate and the media object, the generating of the respective correspondence parameter for each potential recommended media object candidate comprising:
      summing, by the server, the respective user interaction parameter of the potential recommended media object candidate and the media object to obtain a respective sum; and
      assigning the respective sum to each of the overlapping tags;
      adding up the respective sums of all overlapping tags for the given potential recommended media object candidate to obtain the respective correspondence parameter;
   selecting, by the server, at least one recommended media object from the potential recommended media object candidates, the at least one recommended media object being associated with a predetermined value of the correspondence parameter.

2. The method of claim 1, wherein the generating the respective correspondence parameter for each potential recommended media object candidate comprises:
   summing, by the server, the respective user interaction parameter of the potential recommended media object candidate and the media object to obtain a respective sum; and
   multiplying, by the server, for each potential recommended media object, the respective sum by the number of overlapping tags to obtain the respective correspondence parameter.

3. The method of claim 1, wherein the generating the respective correspondence parameter for each potential recommended media object candidate comprises:
   summing, by the server, the respective user interaction parameter of the potential recommended media object candidate and the media object to obtain a respective sum; and
   summing, by the server, the respective sum for each overlapping tag between the potential recommended media object candidate and the media object to obtain the respective correspondence parameter.

4. The method of claim 1, further comprising:
   transmitting, by the server to the client device, an indication of the at least one recommended media object.

5. The method of claim 4, wherein each respective media object is associated with a respective identifier.

6. The method of claim 5, wherein prior to selecting the at least one recommended media object, the method further comprises:
   ranking the potential recommended media object candidates according to their respective correspondence parameters.

7. The method of claim 6, wherein the media object is a video.

8. The method of claim 1, wherein the predetermined value of the correspondence parameter comprises a predetermined number of top-ranked respective correspondence parameters.

9. The method of claim 1, wherein the at least one tag is at least one of: a category, a title, a performer, a subject, a description, a language, a related performer, a rating, a director, a text and a location.

10. The method of claim 9, wherein the at least one tag associated with each respective media object is acquired from a second server.

11. The method of claim 10, wherein the at least one tag was generated from a textual context associated with each respective media object on the second server.

12. The method of claim 1, wherein the user interaction parameter is one of: a view time, a view count, a play rate, an engagement rate, a social sharing rate, a click-through rate (CTR) and a conversion rate.

13. A system for selecting recommended media objects, the system comprising:
a processor;
a non-transitory computer-readable medium comprising instructions;
the processor, upon executing the instructions, being configured to:
acquire a set of indications of media objects, each indication of the set of indications being associated with a respective media object, the respective media object having at least one respective user interaction parameter, the respective user interaction parameter being indicative of a level of interaction of at least one user with the respective media object;
acquire at least one tag associated with each respective media object, the at least one tag being representative of a content of the respective media object;
receive, from a client device, a request for a media object recommendation, the request for the media object recommendation having been triggered by a user having interacted with a media object via the client device;
acquire at least one tag and at least one user interaction parameter associated with the media object;
determine potential recommended media object candidates based on at least one tag of the media object overlapping with tags associated with the respective media objects;
determine, for each potential recommended media object candidate, a number of overlapping tags with the media object;
generate for each potential recommended media object candidate, a respective correspondence parameter based on the number of overlapping tags and the respective user interaction parameter of the potential recommended media object candidate and the media object, the correspondence parameter being indicative of a level of similarity between the potential recommended object candidate and the media object, the generating of the respective correspondence parameter for each potential recommended media object candidate comprising:
summing, by the server, the respective user interaction parameter of the potential recommended media object candidate and the media object to obtain a respective sum; and
assigning the respective sum to each of the overlapping tags;
adding up the respective sums of all overlapping tags for the given potential recommended media object candidate to obtain the respective correspondence parameter;
select at least one recommended media object from the potential recommended media object candidates, the at least one recommended media object being associated with a predetermined value of the correspondence parameter.

14. The system of claim 13, wherein to generate the respective correspondence parameter for each potential recommended media object candidate, the processor is configured to:
sum the respective user interaction parameter of the potential recommended media object candidate and the media object to obtain a respective sum; and
multiply for each potential recommended media object, the respective sum by the number of overlapping tags to obtain the respective correspondence parameter.

15. The system of claim 13, wherein to generate the respective correspondence parameter for each potential recommended media object candidate, the processor is configured to:
sum the respective user interaction parameter of the potential recommended media object candidate and the media object to obtain a respective sum; and
sum the respective sum for each overlapping tag between the potential recommended media object candidate and the media object to obtain the respective correspondence parameter.

16. The system of claim 13, wherein the processor is further configured to:
transmit, to the client device, an indication of the at least one recommended media object.

17. The system of claim 16, wherein each respective media object is associated with a respective identifier.

18. The system of claim 17, wherein prior to selecting the at least one recommended media object, the system is configured to:
rank the potential recommended media object candidates according to their respective correspondence parameters.

19. The system of claim 18, wherein the media object is a video.

20. The system of claim 13, wherein the predetermined value of the correspondence parameter comprises a predetermined number of top-ranked respective correspondence parameters.

* * * * *